(12) United States Patent
Leslie et al.

(10) Patent No.: US 7,670,024 B2
(45) Date of Patent: Mar. 2, 2010

(54) UTILITY LIGHT

(75) Inventors: Stuart Leslie, Larchmont, NY (US);
David Mallard, Somerville, MA (US);
Elliott P. Montgomery, Brooklyn, NY (US); Taek Kim, Washington Township, NJ (US); Roland Zeder, New York, NY (US)

(73) Assignee: Honeywell International Inc., Morristown, NJ (US)

( * ) Notice: Subject to any disclaimer, the term of this patent is extended or adjusted under 35 U.S.C. 154(b) by 249 days.

(21) Appl. No.: 11/837,502

(22) Filed: Aug. 11, 2007

(65) Prior Publication Data

US 2008/0055892 A1      Mar. 6, 2008

Related U.S. Application Data

(60) Provisional application No. 60/837,459, filed on Aug. 11, 2006.

(51) Int. Cl.
*F21L 4/04* (2006.01)
*F21L 4/00* (2006.01)
(52) U.S. Cl. .................. 362/197; 362/199; 362/200
(58) Field of Classification Search ................ 362/197, 362/198, 199, 200, 190, 191, 194, 195, 285, 362/287, 418, 427
See application file for complete search history.

(56) References Cited

U.S. PATENT DOCUMENTS

| 4,459,646 | A | * | 7/1984 | Drane | 362/199 |
| 5,347,440 | A | * | 9/1994 | Roberts et al. | 362/200 |
| 6,142,644 | A | * | 11/2000 | Leung | 362/98 |
| 6,227,677 | B1 | * | 5/2001 | Willis | 362/196 |
| 6,955,442 | B1 | * | 10/2005 | Chan | 362/99 |
| 7,021,789 | B2 | * | 4/2006 | Dalton et al. | 362/190 |
| 7,524,081 | B2 | * | 4/2009 | Dalton et al. | 362/199 |
| 2003/0227770 | A1 | * | 12/2003 | Chen et al. | 362/85 |
| 2004/0114373 | A1 | * | 6/2004 | Lin | 362/352 |

* cited by examiner

*Primary Examiner*—Bao Q Truong
(74) *Attorney, Agent, or Firm*—Cantor Colburn LLP (57) ABSTRACT

A portable utility light comprises a first housing portion, a second housing portion, and a light-emitting source disposed in the second housing portion. The first housing portion has a first end rotatively coupled by a joint to a first end of the second housing portion. The first housing portion is rotatable about the first end of the second housing portion to a first position and a second position. The light-emitting source is electrically coupled to a power supply by an activation switch. The first housing portion is configured to at least partially cover the light-emitting source when disposed in the first position. The first housing portion is configured to support the second housing portion and the light-emitting source in an upright bearing when disposed in the second position.

10 Claims, 14 Drawing Sheets

UTILITY LIGHT

CROSS REFERENCE TO RELATED APPLICATIONS

This application claims the benefit of U.S. Provisional Patent Application Ser. No. 60/837,459, filed Aug. 11, 2006, the contents of which are incorporated herein by reference thereto.

BACKGROUND

Exemplary embodiments of the present invention relate to illumination devices, and more specifically, to a portable, hands-free light assembly.

Portable utility lights are commonly used to provide illumination at times when the use of stationary room lighting techniques is unavailable or inadequate. Examples of such situations can include losses of power, nighttime outdoor activities like camping, searching for items that have been lost underneath a couch or a car seat, providing an indication to other motorists who may be traveling towards a disabled vehicle when visibility is limited, and checking an automobile engine or changing a tire at nighttime, as well as numerous other conditions that require concentration of light while frequently changing locations.

Flashlights are utility lights that are designed to be handheld so as to be easily moved to many locations. A typical flashlight consists of a small incandescent light bulb having an associated parabolic reflector that is powered by electric batteries connected to an electric power switch and mounted within a housing. The housing contains the electric circuit and provides a means of access to the batteries for replacement.

While providing for portability and being lightweight, flashlights are often limited in the amount of illumination that they can provide because the larger bulbs, support assemblies, and power supply components that are required to provide more illumination can result in a bulky structure that makes the handheld light more difficult to hold and orient. Moreover, because flashlights are not designed to provide for hands-free illumination, they can be difficult to position to provide light precisely where it is needed without continually holding and manipulating the light. Another issue with flashlights is that, because they are designed to reflect a source of light for the purpose of direct illumination, they are not optimal to serve a signaling function, particularly to signal a disabled vehicle to oncoming motorists, because the direct illumination can create unwanted glare.

Accordingly, the inventors herein have identified that it is desirable to provide a portable, compact utility light that can be used as a hands-free source of illumination for multiple purposes.

SUMMARY OF THE INVENTION

Exemplary embodiments of the present invention relate to a portable utility light that comprises a first housing portion, a second housing portion, and a light-emitting source disposed in the second housing portion. The first housing portion has a first end rotatively coupled by a joint to a first end of the second housing portion. The first housing portion is rotatable about the first end of the second housing portion to a first position and a second position. The light-emitting source is electrically coupled to a power supply by an activation switch. The first housing portion is configured to at least partially cover the light-emitting source when disposed in the first position. The first housing portion is configured to support the second housing portion and the light-emitting source in an upright bearing when disposed in the second position.

DETAILED DESCRIPTION OF EXEMPLARY EMBODIMENTS

Figure 1:
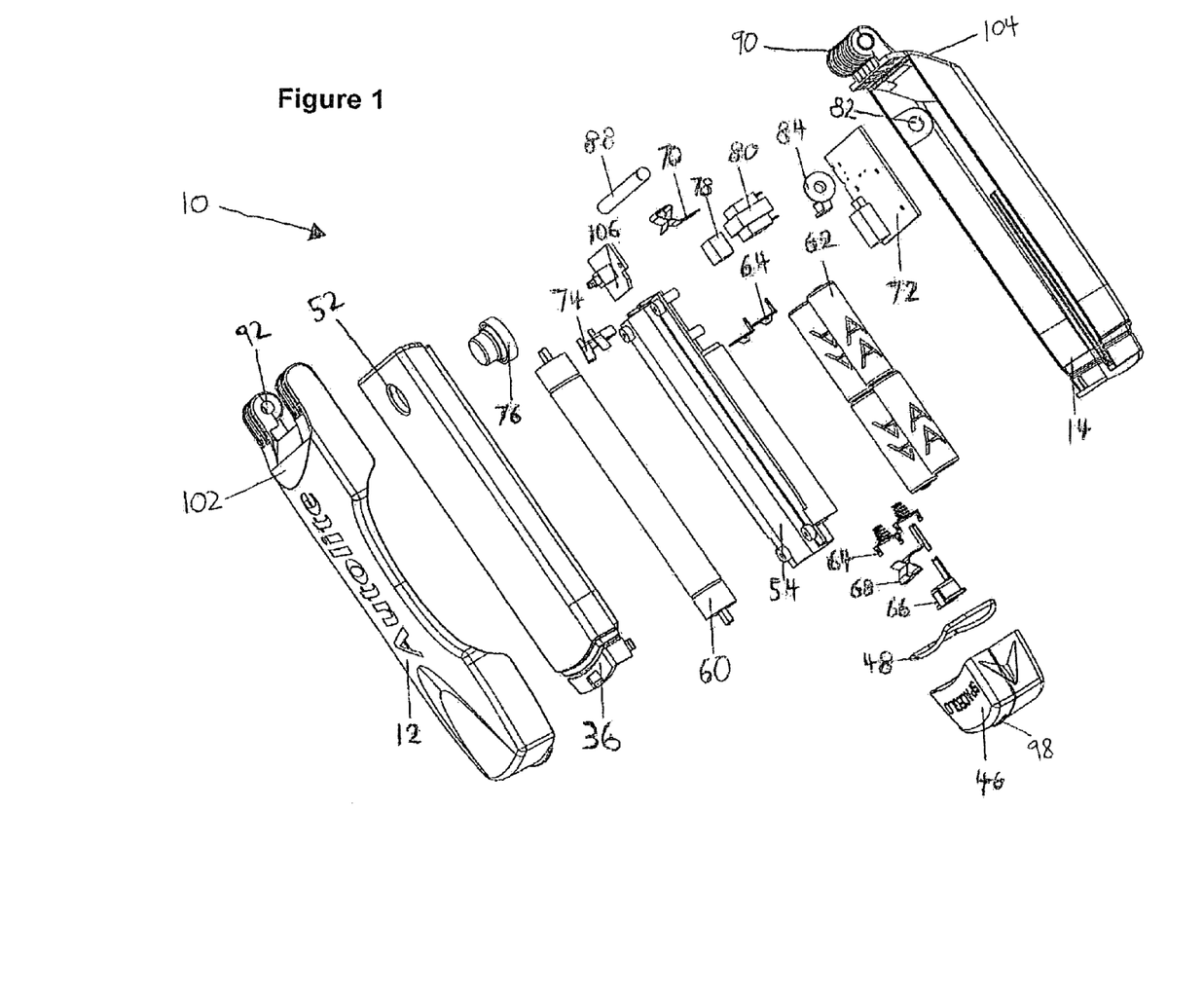
FIG. 1 is an exploded view of a portable utility light in accordance with an exemplary embodiment of the present invention.
Figure 2:
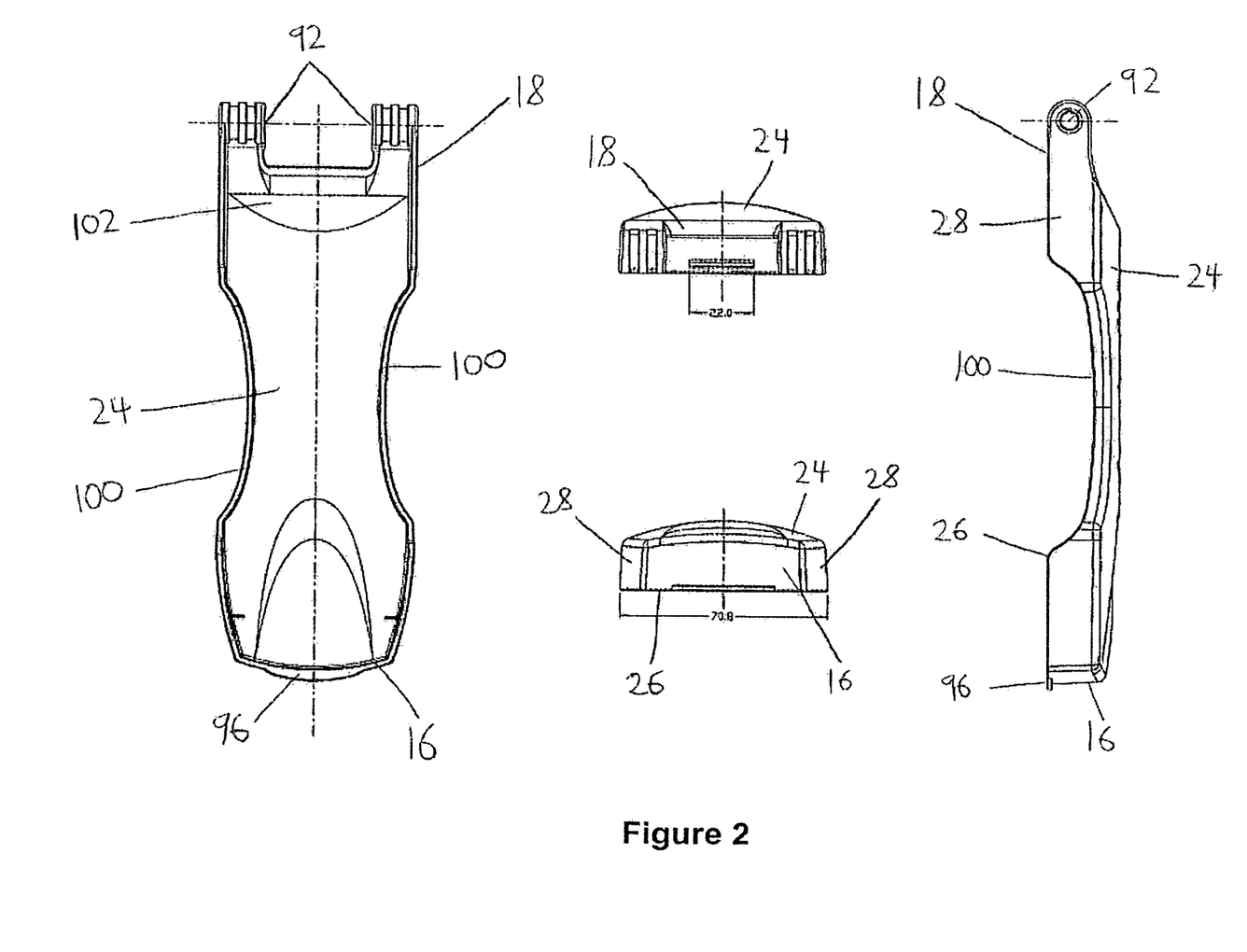
FIG. 2 illustrates various views of a covering portion of an exemplary embodiment of the present invention.
Figure 3:
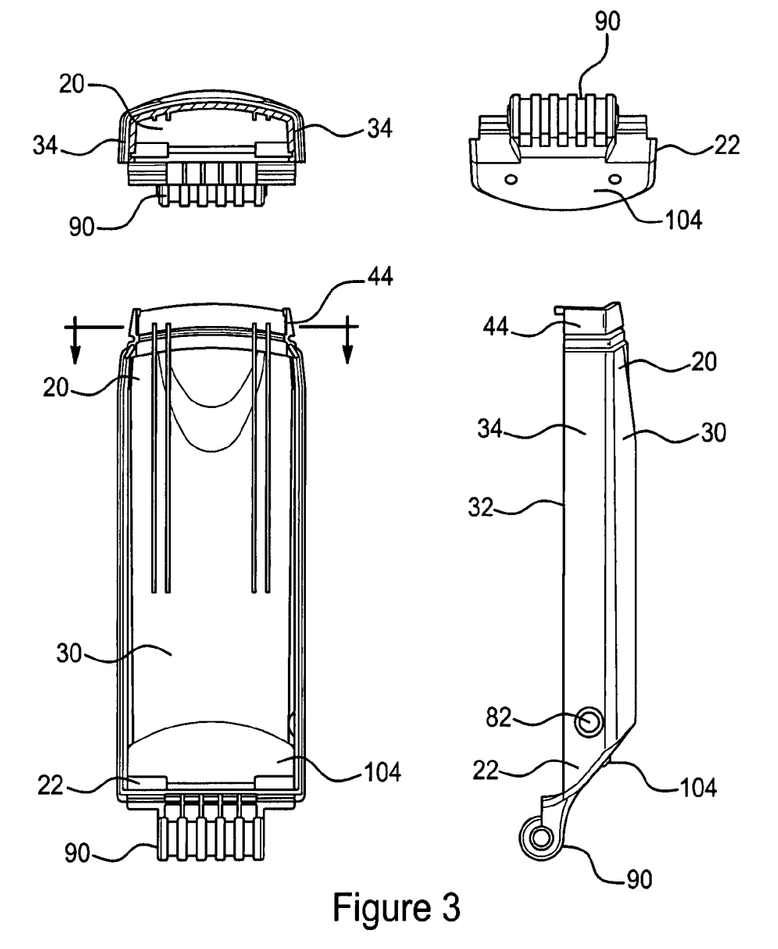
FIG. 3 illustrates various views of a containing portion of an exemplary embodiment of the present invention.

In the following detailed description, reference is made to the accompanying drawings that form a part hereof, and in which is shown by way of illustration, exemplary embodiments of the present invention. These exemplary embodiments are described herein in sufficient detail to enable those skilled in the art to practice the present invention, and it is to be understood that other embodiments may be utilized and that structural changes may be made to the described exemplary embodiments without departing from the scope of the present invention. It should also be noted that terms of orientation and direction such as top, bottom, front, rear, etc. as used herein are used to distinguish elements from one another within exemplary embodiments and should therefore not be taken as limiting the scope of the present invention to any specific orientation. Moreover, the use of the terms first, second, etc. do not denote any order or importance, but rather are used to distinguish one element from another. Furthermore, the use of the terms a, an, etc. do not denote a limitation of quantity, but rather denote the presence of at least one of the referenced item. Therefore, the following detailed descrip- Referring generally to FIG. 1, an exploded view of a portable light assembly constructed in accordance with an exemplary embodiment of the present invention is illustrated and indicated generally at 10. Light assembly 10 includes a hollow light housing divided into an elongated covering portion 12 and an elongated containing portion 14. Covering portion 12 is illustrated in greater detail in various views in FIG. 2, and containing portion 14 is illustrated in greater detail in various views in FIG. 3. Covering portion 12 has a top end 16 and a bottom end 18, and containing portion 14 has a top end 20 and a bottom end 22. Covering portion 12 has a partial, generally rectangular cross-section with a substantially arcuate outer wall 24 extending along its length, an open side 26 extending along its length opposite the outer wall, and a pair of opposing sidewalls 28 extending therebetween along its width. Containing portion 14 has a partial, generally rectangular cross-section with a substantially arcuate outer wall 30 extending along its length, an open side 32 extending along its length opposite the outer wall, and a pair of opposing sidewalls 34 extending therebetween along its width.

In exemplary embodiments, covering portion 12 and containing portion 14 can be formed of a lightweight material, such as an acrylic, an ABS, or a similar plastic material, as light assembly 10 is contemplated to be portable and dimensioned to fit comfortably within a user's hand. For example, one exemplary embodiment has dimensions of approximately 200 mm long, 55 mm wide, and 68 mm tall. Of course, other dimensions greater or less than the aforementioned values are contemplated to be within the scope of exemplary embodiments of the present invention. In exemplary embodiments, the corners at the junctures between sidewalls 28 and outer wall 24, and between sidewalls 34 and outer wall 30, can be contoured to provide a comfortable, solid feeling to light assembly 10 when held in the hand.

Figure 4:
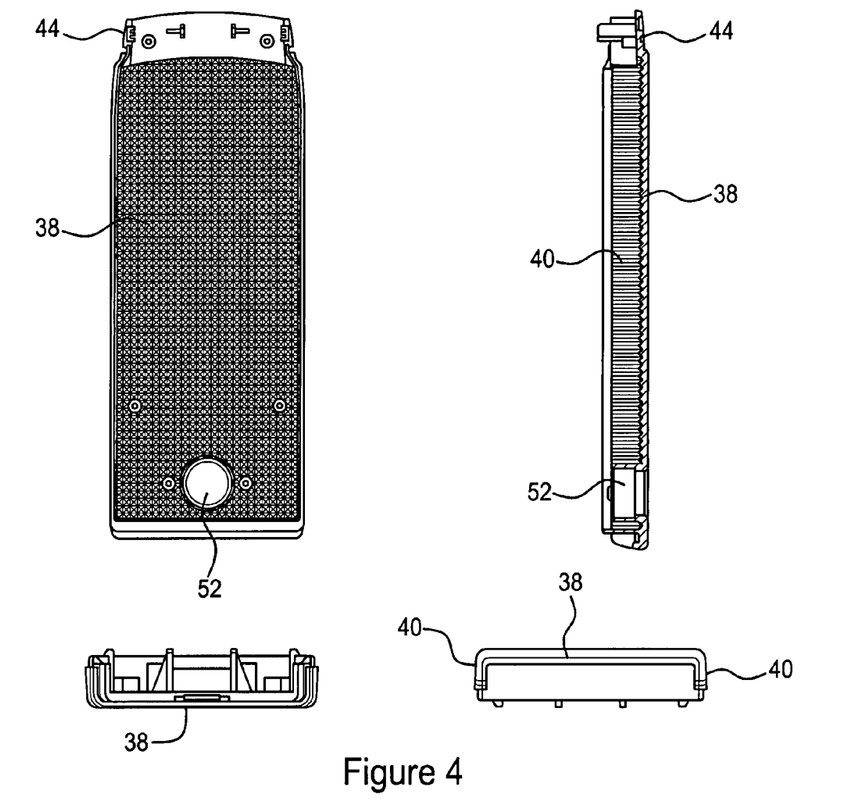
FIG. 4 illustrates various views of a lens member of an exemplary embodiment of the present invention.

A transparent lens member 36 extends longitudinally along open side 32 of containing portion 14 from bottom end 22 to top end 20 to define a space within the containing portion for receiving a plurality of lighting components. Lens member 36 is illustrated in greater detail in various views in FIG. 4. In the present exemplary embodiment, lens member 36 is provided with a diamond pattern on its inside surface for reflecting light. In exemplary embodiments, lens member 36 can be constructed of clear plastic material such as a polycarbonate or similar material and may be configured to have any desired color (for example, clear, red, white, yellow, etc.).

Lens member 36 includes a primary wall 38 that extends longitudinally along open side 32 and a pair of opposing sidewalls 40 that interface with sidewalls 34 of containing portion 14. Lens member 36 and containing portion 14 define an aperture 42 proximate top end 20 that opens into the space defined within the containing portion. Lens member 36 and containing portion 14 are formed with a stepped-down flange 44 of generally rectangular cross-section extending at top end 20 for receiving a removable battery door 46 that is defined by a plurality of sidewalls.

Figure 5:
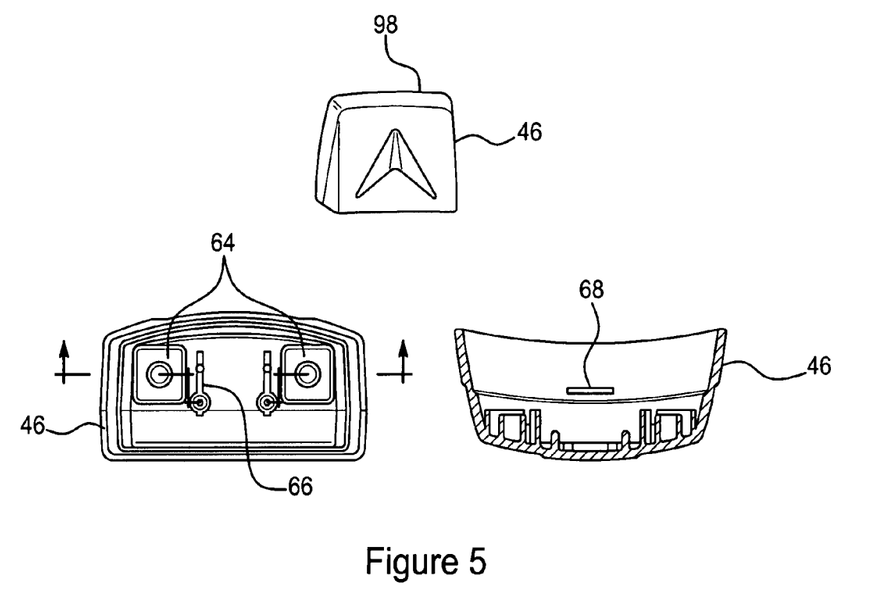
FIG. 5 illustrates various views of a battery door of an exemplary embodiment of the present invention.
Figure 6:
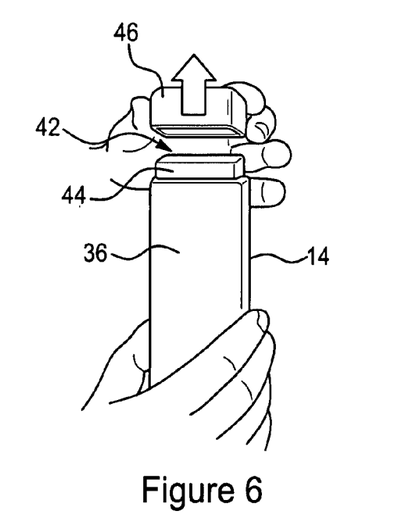
FIG. 6 illustrates usage of a non-limiting exemplary embodiment of the present invention.

Battery door 46, illustrated in greater detail in various views in FIG. 5, can be secured to flange 44 to close aperture 42 and can be removed therefrom, as illustrated in FIG. 6, to provide access to the space defined within containing portion 14. In exemplary embodiments, the sidewalls of battery door 46 can be formed with ridges to aid in gripping the battery door during removal. In the present exemplary embodiment, an elastomer o-ring 48 extends longitudinally around flange 44 to provide for a tight sealing engagement when battery door 46 is secured to flange 44.

Figure 7:
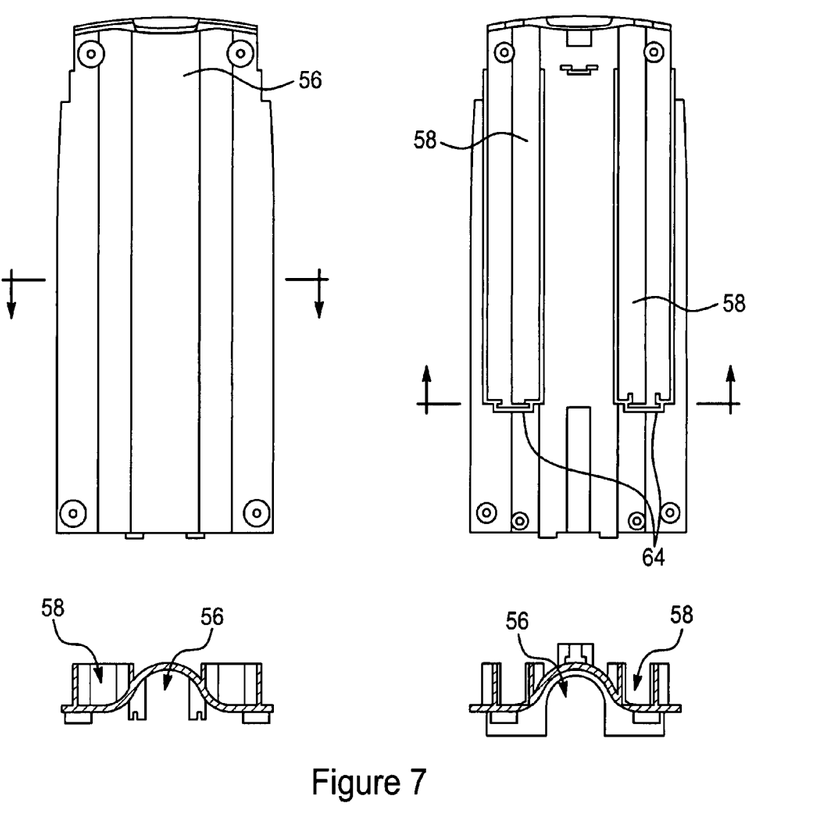
FIG. 7 illustrates various views of a battery holder of an exemplary embodiment of the present invention.

A battery retainer 54 is disposed within and longitudinally extends through the space defined by containing portion 14 and lens member 36. Battery retainer 54, illustrated in greater detail in various views in FIG. 7, includes a front lamp channel 56 that extends proximate lens member 36 and a pair of rear battery channels 58 that extends adjacent outer wall 30.

Figure 8:
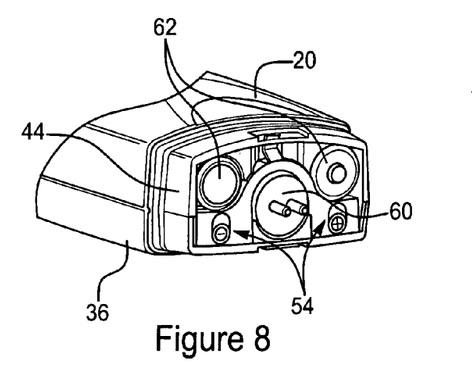
FIG. 8 is a partial, perspective view of various components of an exemplary embodiment of the present invention.

Lamp channel 56 is configured to mount a longitudinally extending light source 60 therein. In the present exemplary embodiment, light source 60 comprises a fluorescent light bulb. Of course, exemplary embodiments of the present invention are not limited solely to the use of fluorescent light bulbs, and it is contemplated that other equivalent luminary devices such as LED light configurations, incandescent light bulbs, or halogen light bulbs may be used. Battery channels 58 are configured to hold battery cells 62, which can be inserted therewithin through aperture 42. In the present exemplary embodiment, battery cells 62 comprise a plurality of dry-cell AA battery cells. Of course, exemplary embodiments of the present invention are not limited solely to the use of AA battery cells, and it is contemplated that any other battery types and configurations suitable for use in portable electronic devices such as, for example, rechargeable nickel cadmium batteries or lithium batteries, may be used. FIG. 8 illustrates top end 20 of containing portion 14 and flange 44 with battery door 46 removed therefrom and battery retainer 54 disposed within the space defined by the containing portion and lens member 36, in which light source 60 and battery cells 62 are respectively installed within lamp channel 56 and battery channels 58 of the battery retainer.

Figure 9:
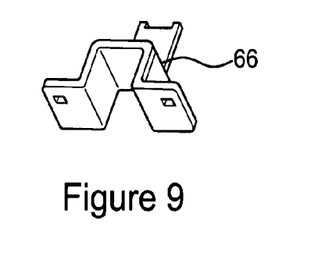
FIG. 9 is a perspective view of a clip holder of an exemplary embodiment of the present invention.
Figure 10:
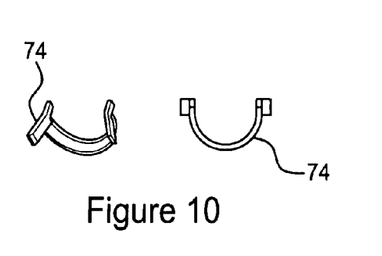
FIG. 10 illustrates various views of a light source holder of an exemplary embodiment of the present invention.

To supply power to light source 60 of light assembly 10, a plurality of cooperating dual contacts 64 are retained within battery retainer 54 and battery door 46 and configured to make electrical contact with the ends of battery cells 62. In addition, battery door 46 retains a clip holder 66, illustrated separately in FIG. 9, for holder a clip member 68 that is configured to receive and make electrical contact with one end of light source 60, and battery retainer 54 also retains a cooperating clip member 70 that is configured receive and make electrical contact with the opposing end of the light source. Clip members 68, 70 are oriented to align light source 60 within lamp channel 56 and also make electrical contact with dual contacts 64. Battery retainer 54 also includes a lamp holder 74, illustrated separately in FIG. 10, mounted within lamp channel 56 near bottom end 22 of containing portion 14 to support light source 60 within the lamp channel against shock and vibration.

Figures 11, 12:
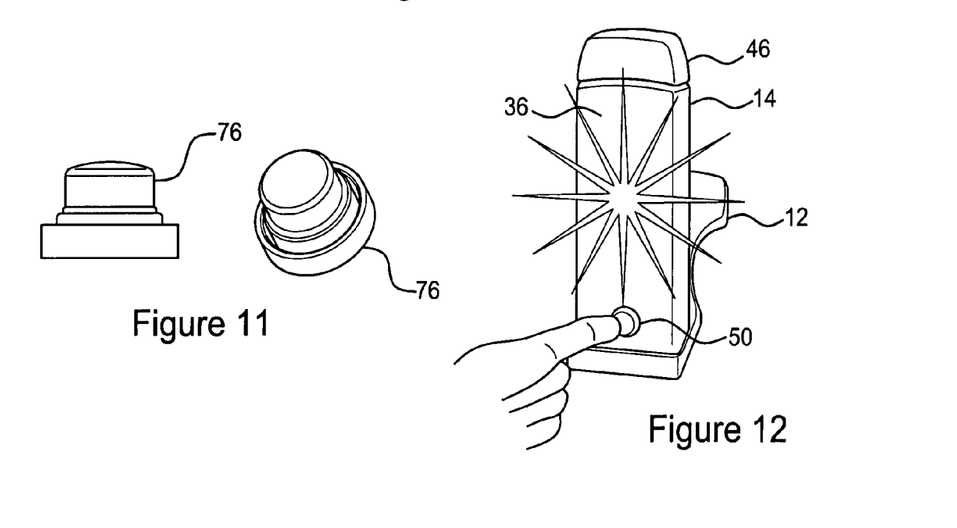
FIG. 11 illustrates various views of a push button switch of an exemplary embodiment of the present invention.
FIG. 12 illustrates usage of a non-limiting exemplary embodiment of the present invention.

Light assembly 10 further comprises an activation switch 50 for providing electrical connection between light source 60 and a voltage source. Switch 50, which comprises a push button key switching mechanism in the present exemplary embodiment, extends out from the space defined within containing portion 14 through an aperture 52 formed in lens member 36. Switch 50 includes a switch housing 76, illustrated separately in FIG. 11, and a switch circuit board assembly 106. Switch circuit board assembly 106 is electrically connected to a main circuit board assembly 72, which is adjacent to outer wall 30 within containing portion 14. Switch 50 is configured to electrically connect power from batteries 62 to switch circuit board assembly 106, which in turn supplies power to light source 60 through clip member 70. Switch 50 can be actuated by a thumb or finger of a person, as illustrated in FIG. 12, to toggle between an open circuit position ("off") and a closed-circuit position ("on") and thereby alternately provide power from batteries 62 to operate light assembly 10. If switch 50 is in the "on" position, light source 60 is configured to emit light when electrical power is connected from batteries 62 to circuit board assembly 72. In exemplary embodiments, switch circuit board assembly 106 can also include circuitry that provides for a varying-illumination level operation of light source 60.

Figure 13:
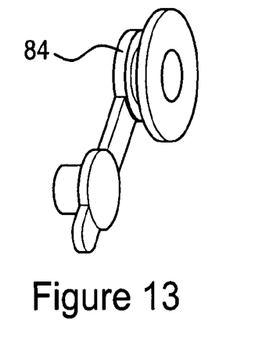
FIG. 13 is a perspective view of a jack cover of an exemplary embodiment of the present invention.

In exemplary embodiments, light assembly 10 does not require there to be another voltage source for operation because battery cells 62 provide an independent voltage source, which can advantageously reduce the size and weight of light assembly 10. In the present exemplary embodiment, to provide for greater functionality, light assembly 10 is also provided with an AC or DC jack 78 and a corresponding adaptor 80 to electrically connect power from an external voltage source (not shown), such as a automobile lighter or a wall outlet, using an appropriate power cord (not shown). Jack 78 can be accessed through an aperture 82 in a sidewall of containing portion 14. A jack cover 84, separately illustrated in FIG. 13, which can be made of a durable and flexible material such as rubber in exemplary embodiments, is disposed on the exterior of sidewall about aperture 82 to provide protection for jack 78 when it is not in use. Adaptor 80 is mounted on circuit board assembly 72 so that electrical power from the external voltage source to light source 60 through switch 50, similar to the manner in which power is supplied from battery cells 62 as described above. When light source 60 is connected to an external power source in this fashion, it is therefore not necessary for batteries 62 to be inserted within battery retainer 54 for light assembly 10 to provide illumination. In exemplary embodiments in which battery cells 62 are of a rechargeable type, light assembly 10 can be configured so that power received through jack 78 can be used to recharge the battery cells.

Figure 14:
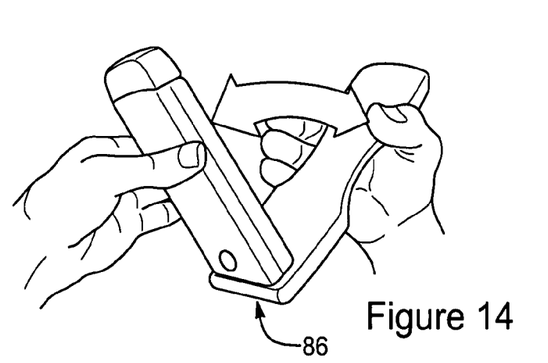
FIG. 14 illustrates usage of a non-limiting exemplary embodiment of the present invention.

Bottom end 18 of covering portion 12 is rotatively coupled to bottom end 22 of containing portion 14 by a joint 86 such that the covering portion is rotatable about the joint. In the present exemplary embodiment, joint 86 comprises a pivot joint in which a pivot pin 88 attaches a ring 90 that is disposed on bottom end 22 of containing portion 14 to a corresponding pair of openings 92 that are disposed on bottom end 18 of covering portion 12 so as to permit pivotal rotation about the pivot pin, as illustrated in FIG. 14. In alternative exemplary embodiments, joint 16 can comprise any other suitable type of hinged joint structure that can provide for rotational motion such as, for example, stiffened, flexible wire or a swivel joint.

Figure 15:
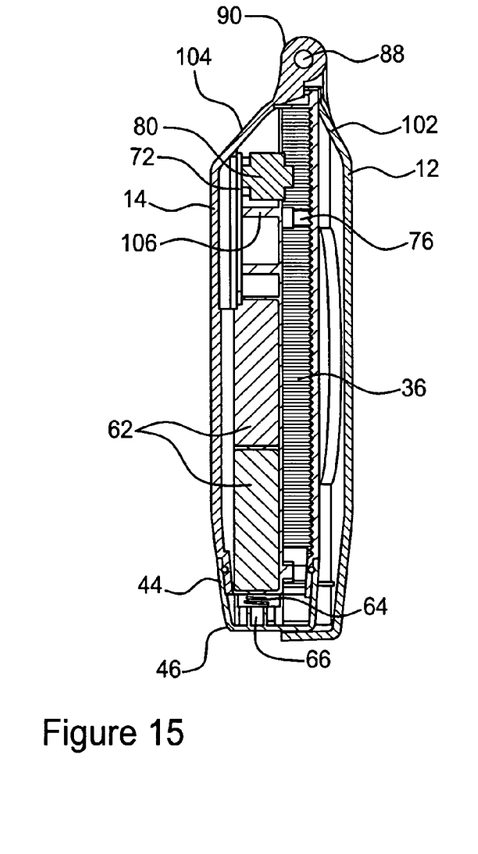
FIGS. 15 and 16 illustrate various views of a non-limiting exemplary embodiment of the present invention in a first operative position.
Figure 16:
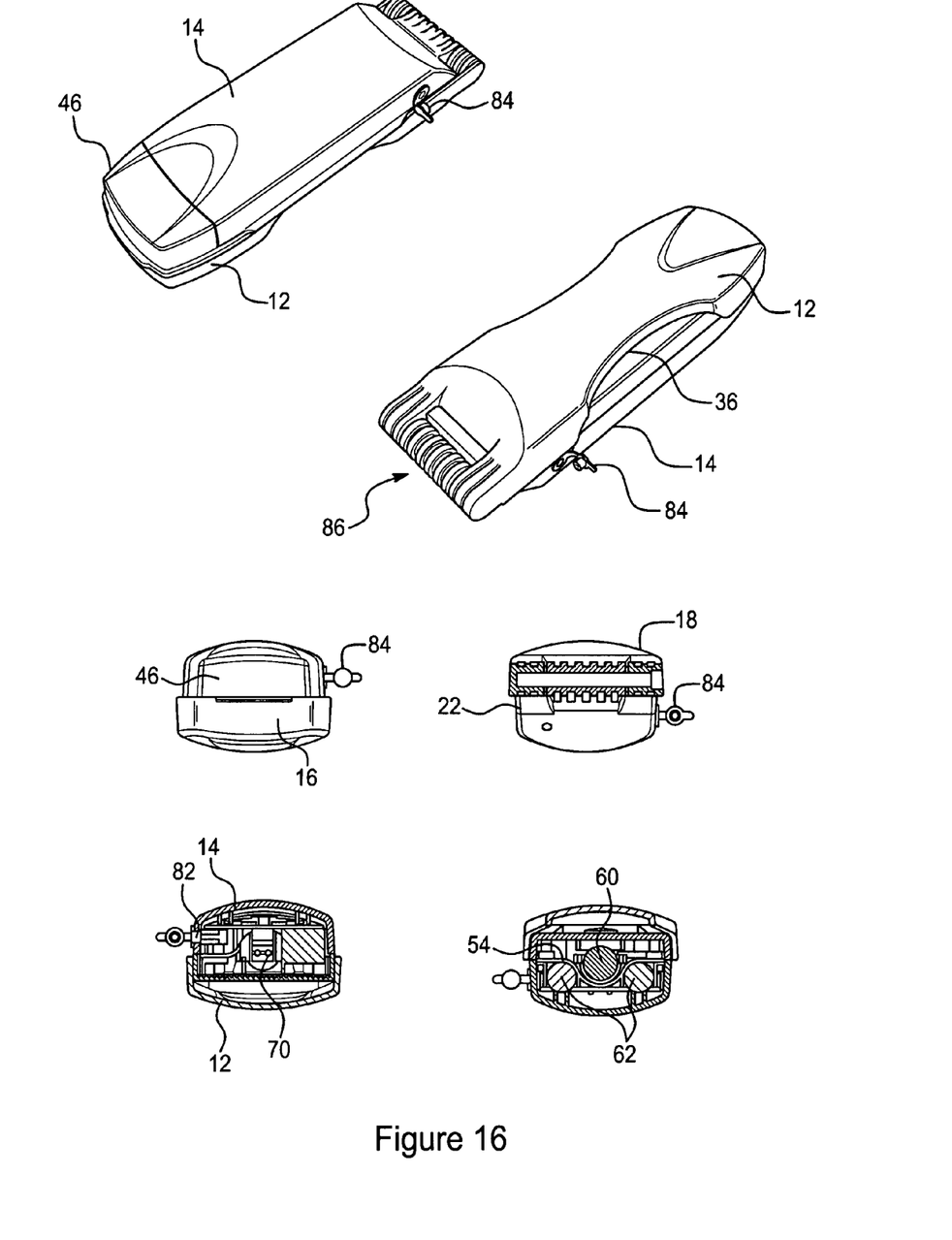

By rotating containing portion 14 about joint 86 relative to containing portion 14, light assembly 10 can be positioned into different angular configurations and thereby permit the light assembly to be used in a number of different functional ways. For example, in a first operative position, containing portion 12 can be rotated about joint 86 so that top end 16 of covering portion 12 is brought into longitudinal alignment with top end 20 of containing portion 14. In this position, which is illustrated in various views in FIGS. 15 and 16, covering portion 12 and containing portion 14 together define a periphery of light assembly 10 within which the lighting components are received. In the present exemplary embodiment, covering portion 12 and battery door 46 at top end 20 of containing portion 14 are provided with corresponding engagement mechanisms that are configured to hold the two housing portions of light assembly 10 stable and adjacent to one another in the first operative position. More particularly, covering portion 12 is formed with a third sidewall 94 extending across top end 16 that has with an inner groove 96 configured to matingly engage a complementary lip 98 that protrudes from battery door 46 as the covering portion is pivoted into the first operative position.

In this example, the first operative position permits covering portion 12 to serve as a protective covering for lens member 36, while also allowing light assembly 10 to take a compact shape so that it can be handled and stored for easy portability. For example, exemplary embodiments of the present invention can be configured and sized for storage within a glove compartment or underneath a car seat when "folded" into this position. Furthermore, in the present exemplary embodiment, covering portion 12 is additionally formed with two longitudinally extending cutout grooves 100 on each opposing sidewall 28 to partially expose lens member 36 on both sides. This allows light assembly 10, when turned on and in the first position of use, to provide for a partial illumination from both sides, which can be useful in instances where a moderate or non-directly focused source of illumination is desired, such as, for example, to provide illumination for a passenger in an automobile begin driven in low visibility conditions without causing a distracting glare for the driver, to serve as a nightlight, or to signal a disabled vehicle to oncoming motorists.

Figure 17:
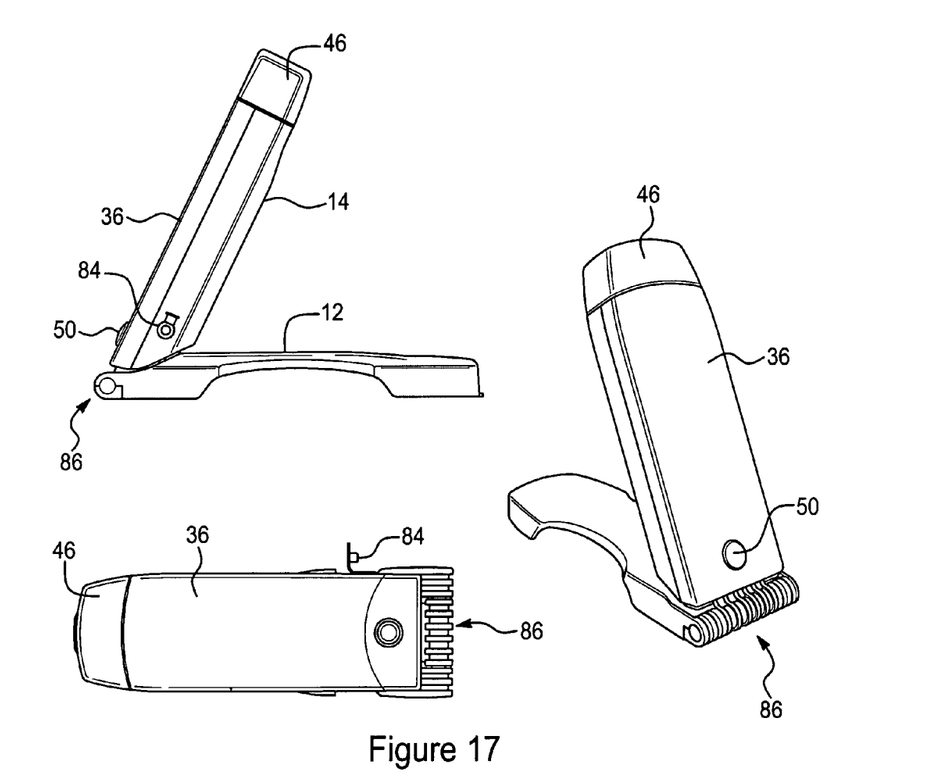
FIGS. 17 and 18 illustrate various views of a non-limiting exemplary embodiment of the present invention in a second operative position.

In a second example operative position, covering portion 12 can be rotated about joint 86 such that containing portion 14 can be held in an upright position while light assembly 10 can rest freestanding supported horizontally on a generally planar surface by opposing sidewalls 28 of the covering portion. With light assembly 10 turned on and "unfolded" into this position, which is illustrated in various views in FIG. 17, light source 60 can be used to provide a hand-free source of illumination directed from lens member 36 through an upright or vertical plane, despite the assembly's ability to take a relatively compact shape when disposed in the first operative position as described above.

Figure 18:
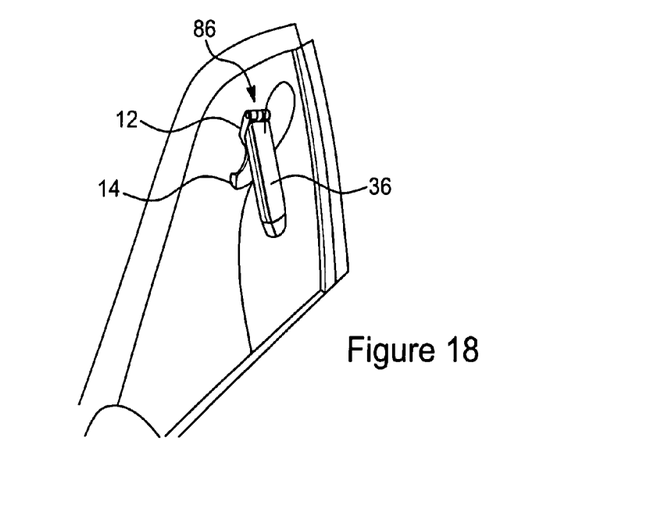
Figure 19:
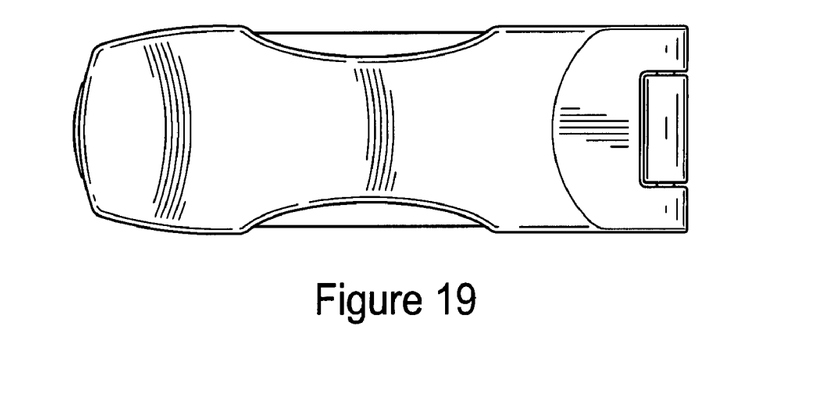
FIGS. 19-29 illustrate various views of non-limiting exemplary embodiments of the present invention in a first and a second operative position.
Figure 20:
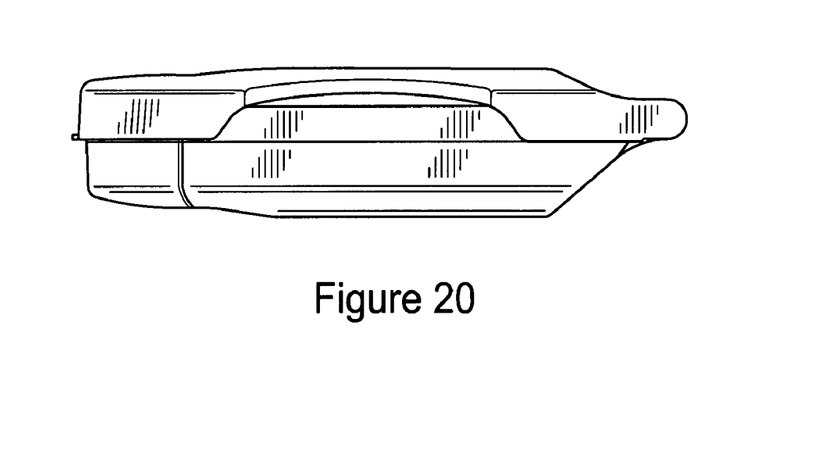
Figure 21:
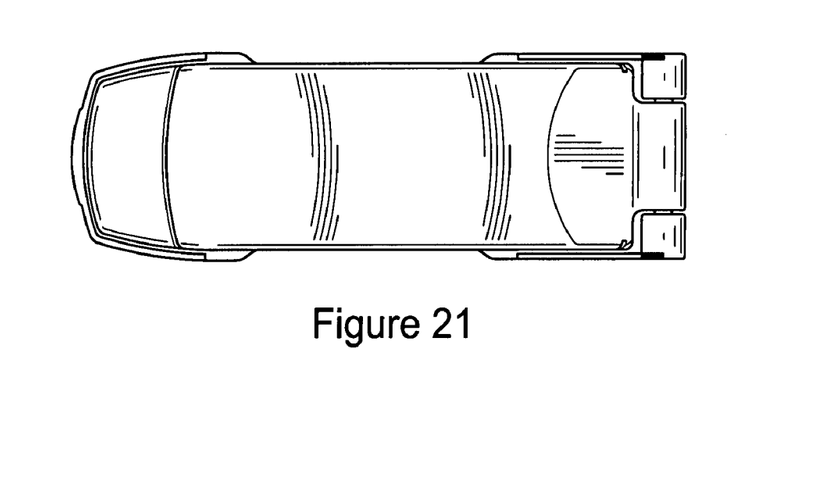
Figure 22:
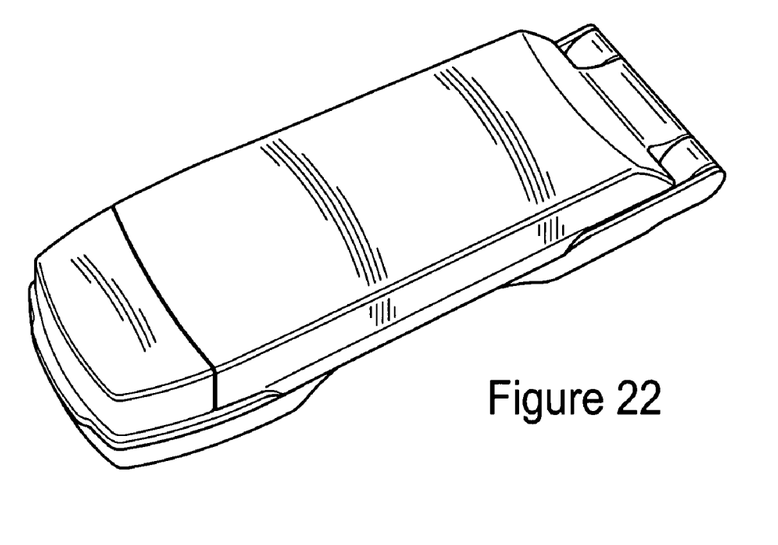
Figure 23:
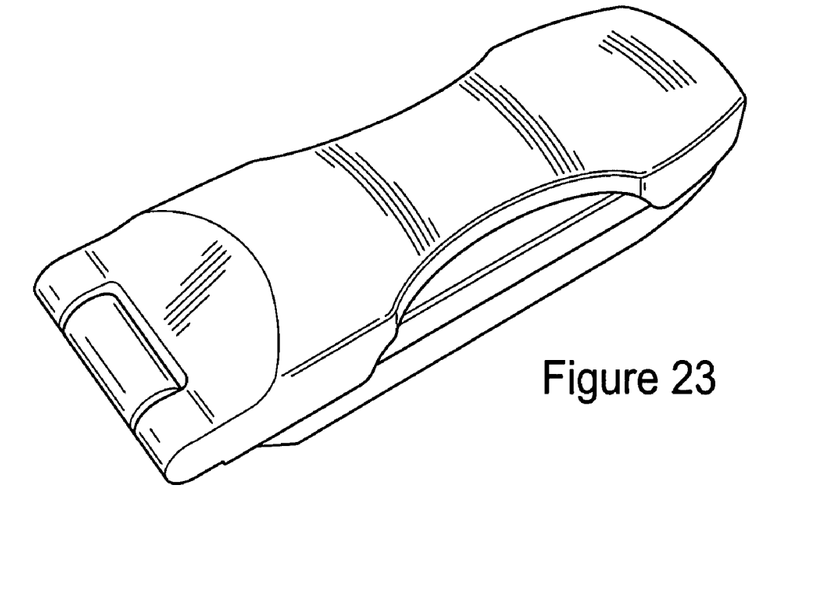
Figure 24:
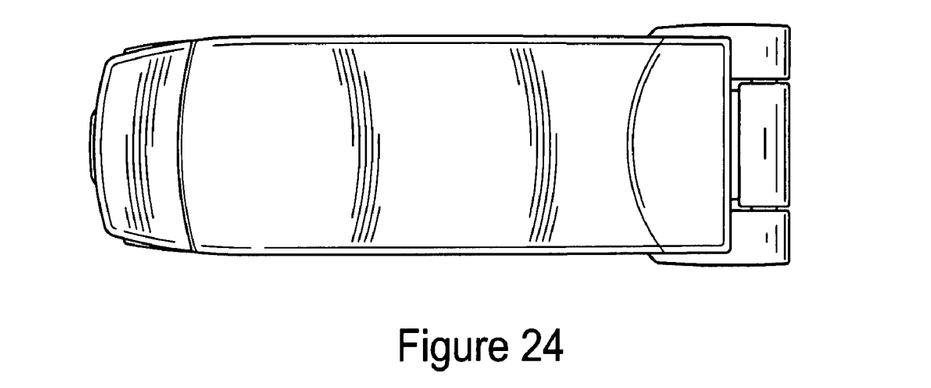
Figure 25:
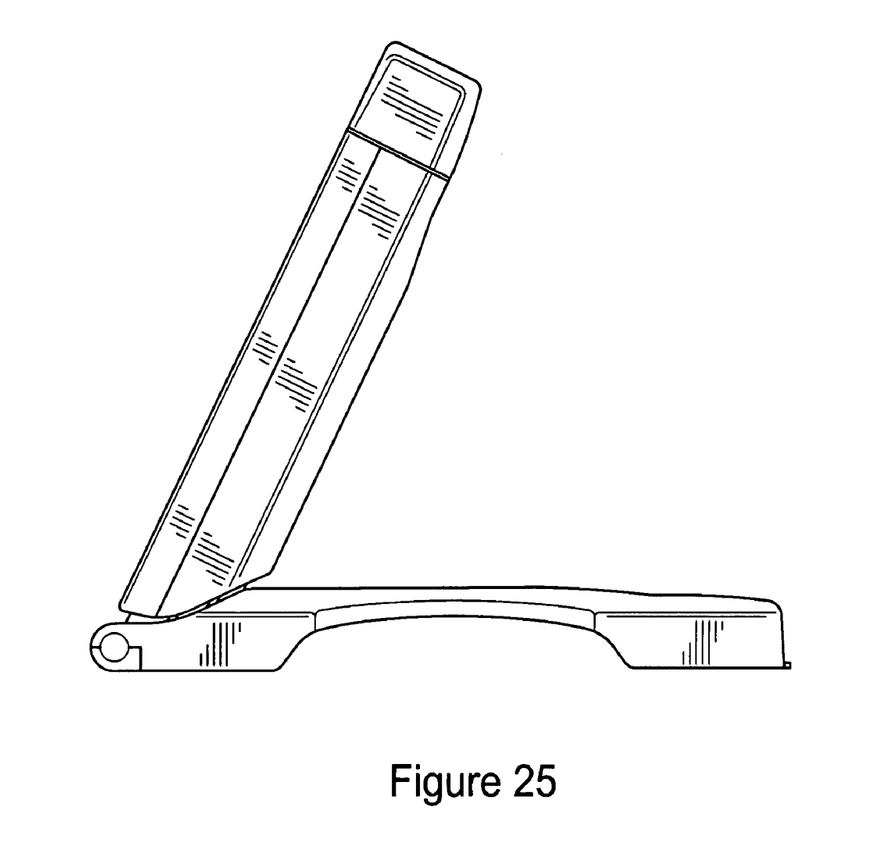
Figure 26:
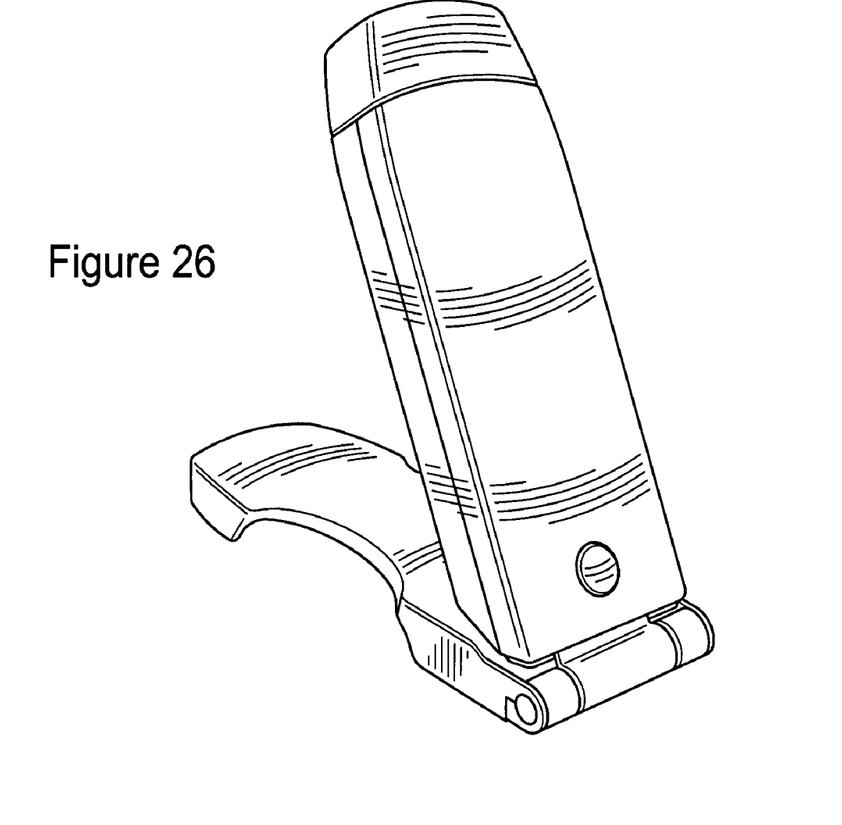
Figure 27:
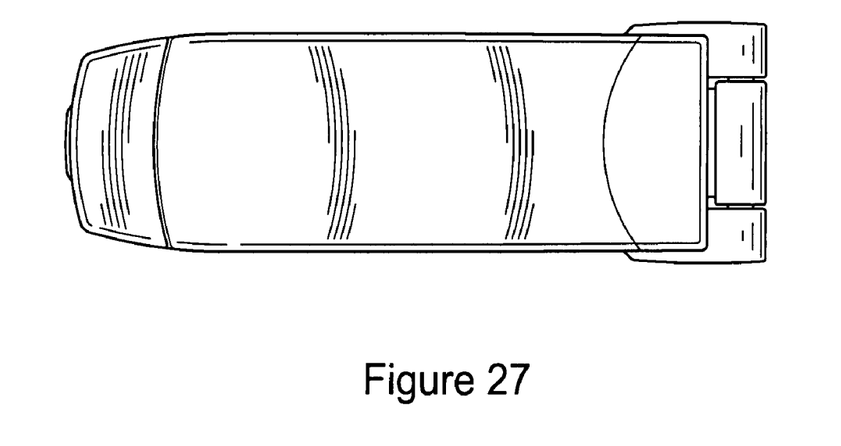
Figure 28:
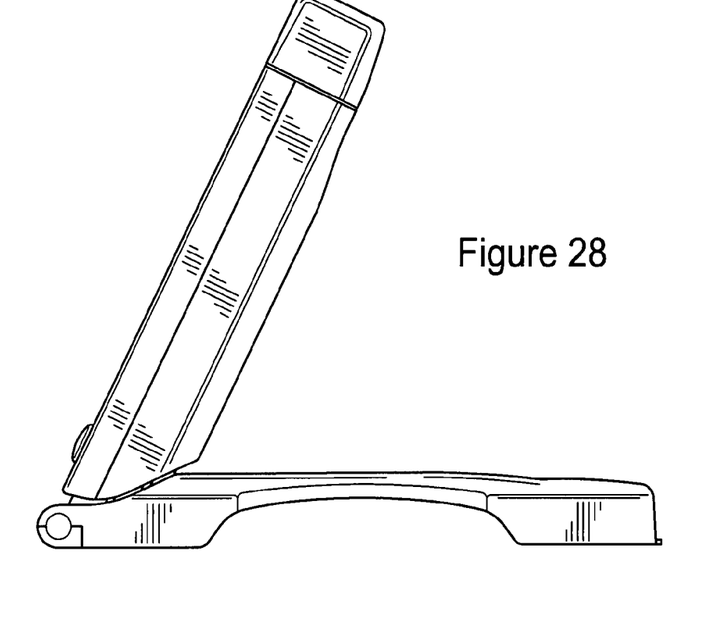
Figure 29:
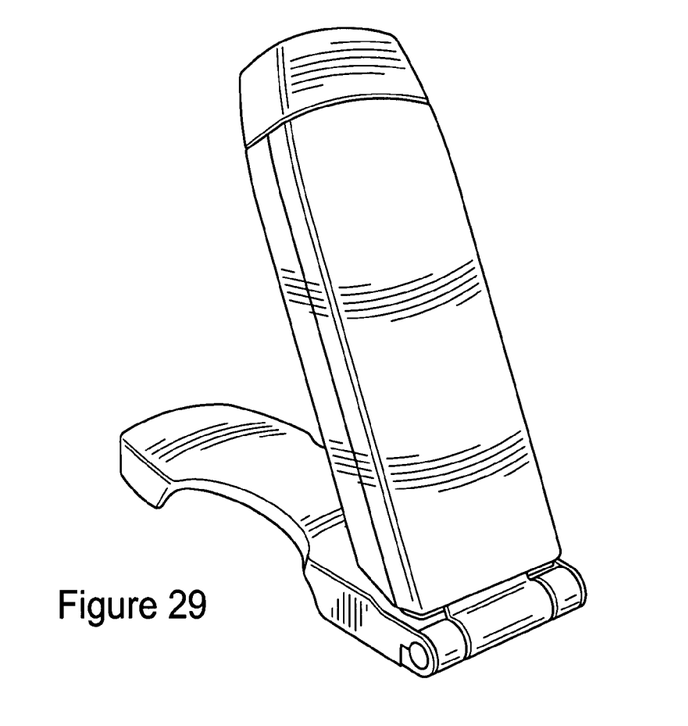

In the present exemplary embodiment, covering portion 12 and containing portion 14 are configured such that outer walls 24, 30 angularly taper toward respective bottom ends 18, 22 at respective abutment sections 102, 104. Abutment sections 102, 104 are complementarily formed to allow rotation of covering portion 12 about joint 86 beyond the point at which the covering point and containing portion 14 form a right angle with respect to one another and to the point at which abutment sections 102, 104 abut against one another. This permits, for example, outer wall 24 to be positioned to lean against outer wall 30 so that containing portion 14 can form an acute angle with covering portion 12 while being held in an upright position by the covering portion. Furthermore, extending the range of rotation in this fashion can create additional mounting options that provide for hands-free operation of light assembly. For example, light assembly 10 can be mounted upon the top end of an open automobile window. In this position, illustrated in FIG. 18, containing portion 14 is suspended upside down from window with lens member 36 positioned to direct illumination away from the window. Containing portion 14 is thus supported in the upright or vertical position shown by abutment section 102 of covering portion 12, which provides a shoulder that be held by the top end of the open window.

FIGS. 19-29 illustrate additional various views of non-limiting exemplary embodiments of the present invention in a first and a second operative position. Exemplary embodiments of the present invention can be implemented as described herein to provide for a compact, portable utility light that can be used in a freestanding or hands-free manner to provide a direct or moderate source of illumination to provide visibility as desired for multiple purposes. Exemplary embodiments of the present invention can be formed of materials that are lightweight, rugged, and weather resistant.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular exemplary embodiments disclosed herein, but that the invention will include all embodiments falling within the scope of the appended claims.

What is claimed is:

1. A portable utility light, comprising:
a first housing portion having a pair of opposing sidewalls;
a second housing portion, the first housing portion having a first end rotatively coupled by a joint to a first end of the second housing portion, the first housing portion being rotatable about the first end of the second housing portion to a first position and a second position;
a light-emitting source disposed in the second housing portion, the light-emitting source being electrically coupled to a power supply by an activation switch, the first housing portion being configured to at least partially cover the light-emitting source when disposed in the first position, the first housing portion being configured to support the second housing portion and the light-emitting source in an upright position when the first housing portion is disposed in the second position, wherein the first housing portion further comprises a longitudinally extending cutout groove formed on each sidewall of the pair of opposing sidewalls of the first housing portion, the longitudinally extending groove on each sidewall being configured to partially expose the light-emitting source when the first housing portion is disposed in the first position.

2. The portable utility light of claim 1, wherein the first and second housing portions are formed of a lightweight plastic material.

3. The portable utility light of claim 1, wherein the light emitting source is located behind a transparent lens member secured to the second housing portion.

4. The portable utility light of claim 3, wherein the lens member is formed of a transparent plastic material and is formed with a light-reflecting diamond pattern on an inside surface thereof.

5. The portable utility light of claim 1, wherein the power supply comprises a plurality of battery cells.

6. The portable utility light of claim 1, wherein the power supply comprises an electrical current source.

7. The portable utility light of claim 6, further comprising an electrical current jack and a corresponding adaptor configured to electrically connect power from the electrical current source to the light-emitting source.

8. The portable utility light of claim 1, wherein the first housing portion is formed with a first abutment section that angularly tapers toward the first end of the first housing portion, wherein the second housing portion is formed with a second abutment section that angularly tapers toward the first end of the second housing portion, and wherein the first and second abutment sections are complementarily configured to allow rotation of the first housing portion about the first end of the second housing portion beyond a point at which the first and second housing portions form a right angle with respect to one another and thereafter to another point at which the first and second abutment sections abut against one another.

9. The portable utility light of claim 1, wherein the light-emitting source comprises an elongated fluorescent light bulb.

10. The portable utility light of claim 3, wherein the activation switch comprises a push button switching mechanism having an actuation button extending through the lens member and wherein the push button switching mechanism is configured to be actuated by a user to toggle between an open-circuit position and a closed-circuit position and thereby alternately provide power from the power supply to the light-emitting source.

* * * * *